UNITED STATES PATENT OFFICE.

JULIUS WEZEL, OF LEIPSIC, GERMANY.

PROCESS OF PRODUCING LITHOGRAPHIC COATINGS ON METALLIC PLATES.

SPECIFICATION forming part of Letters Patent No. 640,245, dated January 2, 1900.

Application filed January 6, 1899. Serial No. 701,393. (No specimens.)

*To all whom it may concern:*

Be it known that I, JULIUS WEZEL, a subject of the King of Saxony, residing at Leipsic, Kingdom of Saxony, Germany, have invented a certain new and useful Improved Process for Producing a Lithographic Stone Coating on Metallic Plates, of which the following is a full, clear, and exact description.

This invention for an improved process for covering zinc plates with a coating of material in imitation of lithographic stone relates to improvements in the process described in a prior British patent, No. 3,305 of 1885, and also United States Patent No. 333,801, dated January 5, 1886, for the production of a coating of material on metal plates as a substitute for lithographic stone. In the practical use of the plates to which the process described in the patent referred to was applied it was found that the prepared coating on becoming discolored or soiled could only be partially remedied by the employment of aluminium palmitate and asphalt, (British patent No. 12,890 of 1891,) as the discoloring could only be prevented in respect to small printings, but not with very large ones. The cause of this discoloration was to be attributed to the quantity of fatty and resinous matter contained in the substance sprinkled on the zinc plates and which caused the ink to be taken up by those parts of the plate on which there was no drawing. On the other hand, however, it was not found possible to dispense with these additional materials which favor discoloration, as it was by means thereof that the coating of material was formed on the zinc plate. Experiments made with the object of dispensing with these materials led to the discovery that it is possible to form a coating composed of mineral matter only, provided that the zinc plate be covered with a coating of some suitable metallic salt previously.

According to this invention the desired result is secured if the zinc plate, after being cleaned, as usual, with sand or emery, is laid during a period of from six to eight hours at the ordinary temperature in an aqueous solution (about ten per cent.) of bicarbonate of potassium. In this way the plate is covered with a firm white coating of carbonate of zinc, which also deprives the edges of the sharpness produced by the grains of sand or emery in consequence of the cleaning and to which the coating of material now sprinkled on firmly adheres. The solution suitable for this latter operation is produced by dissolving one hundred parts of limestone, chalk, or marble with five parts of aluminium by means of twenty-six parts of hydrochoric acid and thirty-two parts of sulfuric acid and evaporating this product to dryness. The dry and powdered mass is held in even suspension in an aqueous solution of about two per cent. of carbonate of soda and sprinkled on the plate covered with the oxid coating by means of an injector. The plate so covered is cleaned by washing and dried. The coating firmly adhering to the plate consists of about sixty-two parts carbonate of lime, thirty-five parts sulfate of lime, and two parts hydroxid of aluminium.

It should be mentioned that the oxid coating alone is quite suitable for printing small impressions as well as for the production and preservation of original lithographs.

I claim as my invention—

1. A process for producing a coating of imitation stone on zinc plates, which consists in first forming on the same a coating of carbonate of zinc and then spraying evenly over the same a pulverized stone mixture held in suspension in an aqueous solution of carbonate of soda substantially as described.

2. A process for producing a coating of imitation stone on zinc plates, which consists in first producing on the said plates a coating of carbonate of zinc, by allowing the plate to lie in an aqueous solution of bicarbonate of potassium for a period as specified and then spraying onto the same a pulverized mixture of stone particles and aluminium, dissolved in a mixture of hydrochloric and sulfuric acid as specified, and dried and pulverized, said powder being held in even suspension in an aqueous solution of carbonate of soda when sprayed onto the plate in the manner and for the purpose substantially as described.

In witness whereof I have hereunto set my hand in presence of two witnesses.

JULIUS WEZEL.

Witnesses:
 RUDOLPH FRICKE,
 HERM. SACK.